United States Patent
Gottwald et al.

(10) Patent No.: US 7,596,320 B2
(45) Date of Patent: Sep. 29, 2009

(54) PREEMPHASIS OF AN OPTICAL WAVELENGTH MULTIPLEX SIGNAL

(75) Inventors: Erich Gottwald, Holzkirchen (DE); Lutz Rapp, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 614 days.

(21) Appl. No.: 11/239,412

(22) Filed: Sep. 29, 2005

(65) Prior Publication Data

US 2006/0067686 A1    Mar. 30, 2006

(30) Foreign Application Priority Data

Sep. 30, 2004    (DE) .................. 10 2004 047 693

(51) Int. Cl.
*H04J 14/02*    (2006.01)
(52) U.S. Cl. ................. 398/94; 398/193; 398/197
(58) Field of Classification Search ........... 398/79, 398/93, 94, 95, 193, 197
See application file for complete search history.

(56) References Cited

U.S. PATENT DOCUMENTS

| | | | |
|---|---|---|---|
| 6,040,933 A | 3/2000 | Khaleghi et al. | |
| 6,959,149 B2 * | 10/2005 | Bragg et al. | 398/26 |
| 7,020,092 B1 * | 3/2006 | Weiske et al. | 370/252 |

FOREIGN PATENT DOCUMENTS

| | | | |
|---|---|---|---|
| DE | 198 48 989 A1 | 5/2000 | |
| DE | 10 2004 018 166 A1 | 12/2004 | |

OTHER PUBLICATIONS

A. R. Chraplyvy, J. A. Nagel and R. W. Tkach; "Equalization in Amplified WDM Lightwave Transmission Systems"; IEEE Photonics Technology Letters; Aug. 1992; pp. 920-922; vol. 4, No. 8.

A.R. Chraplyvy, J.A. Nagel and R.W. Tkach, "Equalization in amplified WDM lightwave transmission systems", IEEE Photonics Technology Letters, vol. 4, No. 8, Aug. 1992, pp. 920-922, Abstract.

* cited by examiner

*Primary Examiner*—Christina Y Leung
(74) *Attorney, Agent, or Firm*—Dickinson Wright PLLC

(57) ABSTRACT

Methods are described for preemphasizing an optical multiplex signal that comprises a plurality of signals having different wavelengths, which are transmitted by a transmitter to a receiver. Power levels for the signals are set at the transmitter and measured at the receiver. A mean power level for the transmit-side signals is ascertained. New signal power level values are ascertained from the current power levels of the signals at the transmitter and at the receiver and set on the transmit side such that signal-to-noise ratios for all signal are approximately equalized at the receiver. In order to make more precise settings for the preemphasis, mean gain values and mean attenuations are ascertained from the sum power levels for the multiplex signal measured at the input and at the output of each amplification section and incorporated together with an effective noise figure into the process of ascertaining the new signal power level values. The preemphasis is thus performed autonomously without there being any need for further planning resources for control purposes.

16 Claims, 1 Drawing Sheet

PREEMPHASIS OF AN OPTICAL WAVELENGTH MULTIPLEX SIGNAL

CROSS REFERENCE TO RELATED APPLICATIONS

This application claims priority to the German application No. 10 2004 047 693.4, filed Sep. 30, 2004 and which is incorporated by reference herein in its entirety.

FIELD OF INVENTION

The invention relates to a method for preemphasizing an optical multiplex signal that comprises a plurality of signals having different wavelengths, which are transmitted by a transmitter by way of a large number of amplification sections (i=0, 1, 2, . . . N) to a receiver.

SUMMARY OF THE INVENTION

Optical amplifiers for wideband optical signals exhibit a wavelength dependency concerning the gain which is not completely eliminated by smoothing filters that are normally used. In the case of the WDM or DWDM transmission technology (WDM=Wavelength Division Multiplex; DWDM=Dense Wavelength Division Multiplex) the optical signal comprises a plurality of channels having different wavelengths whose wavelength spacings can today lie below 100 GHz. As a result of the wavelength dependency of the gain of the amplifiers, performance differences between the individual channels accumulate when using an optical transmission path, with the result that the channels have significantly differing optical signal-to-noise ratios (OSNR) and power levels at the receivers.

In point-to-point connections, a method known as "preemphasis" is therefore frequently used for leveling the signal-to-noise ratio or OSNR values at least at the end of the path, which has been described in A. R. Chraplyly, J. A. Nagel and R. W. Tkach: "Equalization in Amplifier WDM Lightwave Transmission Systems", IEEE Photonics Technology Letters, Vol. 4, No. 8, August 1992, pp. 920-922. In this situation, the transmitter-side channel power levels are updated in an iterative process using an OSNR distribution measured at the end of the path until the same signal-to-noise ratios or OSNR values result at the end of the path for all channels.

The amplified spontaneous emission ASE between the channels is often measured in order to determine the signal-to-noise ratios OSNR, and from the former the noise power superimposed on the channels is calculated by means of interpolation. However, this is no longer possible if the amplified spontaneous emission ASE between the channels is attenuated in a wavelength-dependent fashion by optical components. This is the case, for example, if further modules such as add-drop modules or interleaver filters are included in the transmission path.

All the usual methods for measuring the OSNR distribution at the end of the path share in common the fact that they are restricted to channel separations greater than or equal to 100 GHz in the channel subdivision. Furthermore, the methods are generally too slow (separate measurements for channel power levels and power levels of the amplified spontaneous emission ASE) to be able to satisfy timing requirements in dynamic optical networks, for example a maximum of about 10 seconds for a channel upgrade.

A method is known from DE 19848989 for setting transmission signal power levels on a channel-wise basis, whereby if the transmit-side dynamic range is exceeded to an impermissible extent the transmission signal power levels are compressed in such a manner that the transmission signal total power level is kept approximately constant. This method is likewise implemented if the receive-side dynamic range is exceeded.

Since this method is based on measured OSNR values, the problems associated with the OSNR measurement already described above are also encountered here with regard to small channel separations.

The object of the invention is to set down a new method which enables simple preemphasizing of an optical multiplex signal. The method is intended to be suitable for a WDM transmission along an optical transmission path which is to be defined and which has channel separations of any small magnitude.

The object is achieved by the claims.

Methods are described for preemphasizing an optical multiplex signal which as its channels comprises a plurality of signals having different wavelengths, which are transmitted by transmitters to receivers, whereby power levels of the signals are set at the transmitter and measured at the receiver. In this situation, it is no longer necessary to ascertain the signal-to-noise ratios OSNR at the receiver. For this purpose, a mean power level for the signals is determined at the transmitter and then on the transmit side new power levels for the signals are set from current power levels for the signals at the transmitter and at the receiver and from the mean power level at the transmitter is such a way that signal-to-noise ratios at the receiver are approximately leveled or adjusted. According to the invention, a significant improvement in preemphasis is achieved by ascertaining mean gain values and mean attenuations from the sum power levels for the multiplex signal measured at the input and at the output of each amplification section and incorporating them when ascertaining the new power level values.

Advantageously, when using these methods, there is no longer any requirement for a planning tool in order to select for example an exponent parameter, as described in the prior art, when calculating a gain in order to ascertain new power levels for the signals. The methods enable an automatic and iterative preemphasis which is carried out to this end on the basis of an exact characterization of gain values and noise figures for components such as amplifiers, fibers, etc. of one or more sections of a corresponding transmission system precisely with reference to the setting of new power levels for the transmit-side signals. The preemphasis is thus performed autonomously without there being any need for planning resources for control purposes.

In order to control the amplifiers in a transmission system the sum power levels are measured at the input and at the output of the amplifiers. The mean gains of the individual amplifiers and the attenuations of the fiber paths can be calculated from this data. It is advantageous to implement a preemphasis by using this data which is already known in the system in such a manner as to dispense with the determination of an optimum exponent parameter using a planning tool, as described in the prior art. This aspect is described in detail on the basis of the further parts of the description.

A further advantage of the invention is the fact that no measurement of the signal-to-noise ratios or of the noise powers but only level measurements of signals are required. As a result of the measurement and setting the new power levels at a transmitter by means of a simple measurement of signal power levels at a receiver, the preemphasis according to the rule formulation according to the invention takes place far more quickly than a preemphasis based on signal-to-noise ratios. System-related and therefore complex measurement of noise powers of the signals are thus no longer required. A complicated measurement of noise powers between the channels or even a direct and technically extremely complex measurement of the amplified spontaneous emission ASE superimposed on the channels for ascertaining the signal-to-noise ratios OSNR is dispensed with. The method is thus ideally suited for spacings, however small, between wavelengths of the channels.

It is naturally possible to combine the methods with a following preemphasis which is based on a measurement of the signal-to-noise ratio and which results in an optimum setting of the channel power levels at the transmitter. The fact that this requires considerably more time has no negative effects on the quality of transmission. The method according to the invention no longer requires any such known preemphasis, however, in order to satisfy approximately the same requirements. This advantageous aspect has been proven theoretically and experimentally in the laboratory. This brings savings in terms of expensive spectral resolution measuring instruments such as optical spectrum analyzers.

An important advantage of the invention likewise consists in the fact that the described methods are unaffected by any existing tilt or by any further existing uneven spectral distribution of the power levels and/or of the signal-to-noise ratios OSNR at the transmitter.

In the entire invention the expressions "transmitter" and "receiver" are used for reasons of simple representation. It should be made clear here that these expressions denote any location on a transmission path at which the preemphasis according to the invention can be carried out, in other words for example at optical amplifiers, at multiplexers and demultiplexers, at spectrally controllable filters, etc. To this end, at least a first control and measurement module provided for the power level spectrum must be present at one "transmitter" location and a second measurement module provided for the power level spectrum must be present at one "receiver" location.

The methods according to the invention for preemphasis and their implementation are suitable for an optical transmission path having a plurality of amplification sections. An amplification section is understood to comprise at least one amplifier and one fiber, along with optional components such as add-drop modules, filters, insulators, etc. This transmission path could be part of a more complex optical network in which at least WDM signals are transmitted.

An implementation of the preemphasis according to the invention can be realized on a software basis in a system corresponding to the prior art without any hardware equipment. For this purpose, a data volume is used together with a program which can be loaded into a control module (usually the network management facility), whereby the control module executes the method according to the invention in accordance with all the technical aspects and effects of the invention when the aforementioned program is executed.

Embodiments of the invention are described in detail in the following with reference to the figures.

DETAILED DESCRIPTION OF THE INVENTION

Figure 1:
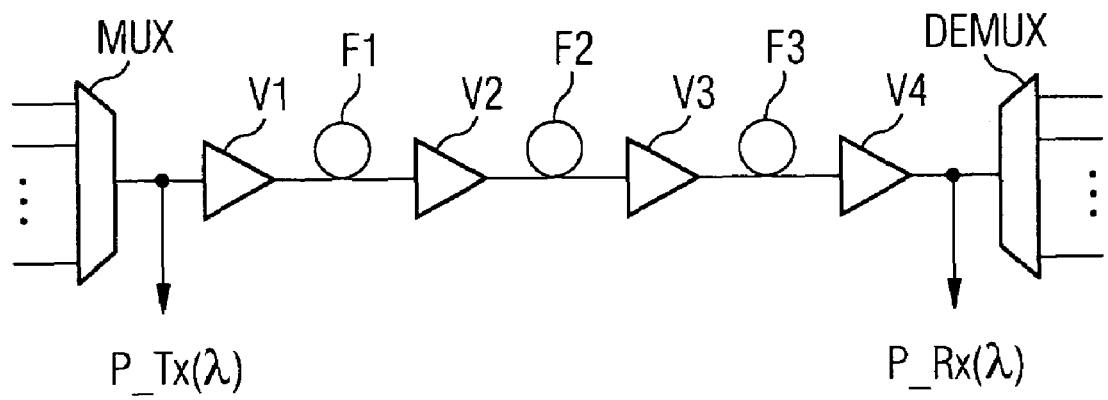
FIG. 1 shows an optical transmission system for application of the method according to the invention.

FIG. 1 represents an optical transmission system for application of the method according to the invention, into which on the transmit side optical signals are fed as channels of a WDM signal by means of a multiplexer MUX. A first amplifier V1 (booster) is located at the input to the transmission system. The power levels $P\_Tx(\lambda)$ of the signals are measured at the input to the first amplifier V1, using a power level measuring device for example. Downstream of the first amplifier V1 is connected a first transmission fiber F1. The first amplifier V1 and the first transmission fiber F1 form a first amplification section. Downstream of the first transmission fiber F1 are likewise connected two further optical serially connected amplification sections comprising a second amplifier V2, a second transmission fiber F2, a third amplifier V3, and a third transmission fiber F3. At the output from the last transmission fiber F3 is connected a last amplifier V4 at whose output the power levels $P\_Rx(\lambda)$ of the transmitted signals are measured. The expression "power level" here is understood to be a signal power level in contrast to a noise power or to signal-to-noise ratios. The fourth amplifier forms the final stage of the transmission system and its output is connected to a demultiplexer DEMUX for re-separation of the multiplexed signals. This "point-to-point" path can furthermore be a part of a complex network with regard to which the method according to the invention can be applied for all "point-to-point" paths which are formed as a plurality of serially connected amplification sections.

Nowadays, such "point-to-point" paths generally have preemphasis setting facilities for adjusting the power levels $P\_Tx(\lambda)$ of the signals at the input to the first amplifier V1, for example in such a manner that a desired spectrum profile of power levels $P\_Rx(\lambda)$, of signal-to-noise ratios or of bit error rates is generated at the output from the transmission system. Such preemphasis setting facilities can also be present on a section-wise basis for certain amplification sections, for example in order that tilted power levels are better distributed along the path such that a necessary high degree of tilt at the input to the entire transmission system and any possible signal distortion effects thereby caused as a result of non-linearities in the case of high-performance channels do not occur. For the method according to the invention, in exactly the same manner it is possible to define a subdivision into a plurality of preemphasis stages with regard to one amplification section or a group of amplification sections (FIG. 1 comprises three amplification sections with the receiver-side amplifier V4).

Methods according to the invention are described in detail in the following, however the reason why the methods are considerably simpler and more cost-effective compared with a method requiring a planning tool will be mentioned first.

A method is known from German patent application DE 10 2004 018 166.7 whereby for any given channel power level distribution $P\_Tx(\lambda)$ at the input to the transmission system the corresponding channel power level distribution $P\_Rx(\lambda)$ is first measured at the output from the transmission system. In a second step, new input power levels $P\_Tx(\lambda)^{NEW}$ are set for the preemphasis according to the specification:

$$P\_Tx(\lambda)^{NEW} = \langle P\_Tx(\lambda)\rangle \cdot \frac{(P\_Tx(\lambda)/P\_Rx(\lambda))^{0.5}}{\langle (P\_Tx(\lambda)/P\_Rx(\lambda))^{0.5}\rangle}$$

whereby angle brackets ⟨⟩ enclosing an argument stand for the mean value of the argument over the wavelength. Approximately identical values for the signal-to-noise ratios OSNR for all the output-side channels can thus be achieved, but differences from a pure OSNR preemphasis still result (in other words a preemphasis which is based on OSNR measurements in order to achieve approximately identical values for the signal-to-noise ratios OSNR).

It can also be shown that the magnitude of these differences can be significantly reduced through the introduction of a variable exponent k with values in the range from 0 to 1—compared with 0.5 in the above equation—with the result that the method more closely approaches the optimum results of an OSNR preemphasis. The transmit-side power levels $P\_Tx(\lambda)$ are now set according to the specification.

$$P\_Tx(\lambda)^{NEW} = \langle P\_Tx(\lambda)\rangle \cdot \frac{(P\_Tx(\lambda)/P\_Rx(\lambda))^{k}}{\langle (P\_Tx(\lambda)/P\_Rx(\lambda))^{k}\rangle}$$

Since the transmission function of the link can change if the input spectrum changes, the thing to do is apply this method repeatedly.

The task now presents itself of determining an optimum setting for the exponent k. For this purpose, signal-to-noise ratios OSNR must be ascertained as a function of the exponent k. This function shows the minimally occurring signal-to-noise ratios OSNR as a function of the exponent k for a particular configuration of the transmission system. An optimum—for example at about 0.45—for the exponent k is sought in order for the signal-to-noise ratios OSNR to exhibit maximum values. If transmission parameters change, a planning tool must take account of this in order to re-adjust the value for the exponent k.

As a result of the methods according to the invention, in an advantageous manner this requirement for a planning tool or for a new search for an optimum no longer applies. A simpler and also faster preemphasis is thereby achieved. Furthermore, it is also shown that the preemphasis is likewise carried out more exactly.

New methods steps for setting the new power levels for the transmit-side signals (through power tilt here) can be formulated as follows:

In a first step, the amplifiers are set such that a power tilt at the input to the following amplifier in each case and at the output from the last amplifier V4 (preamplifier) disappears at the end of the path (power tilt=0).

A gain $G_{link}(\lambda)$ is calculated from the linear power level spectra $P\_Tx(\lambda)$, $P\_Rx(\lambda)$ measured at the input to the booster V1 and at the output from the preamplifier V4. From this is then subtracted its mean value.

The function $Q(\lambda)$ for describing the new power level spectrum $P\_Tx(\lambda)$ to be set at the input to the transmission system comprising N amplification sections is now calculated according to the specification $$Q(\lambda) = \sum_{i=0}^{N} G_{link}^{-i/(N+1)}(\lambda)\cdot\langle G_i(\lambda)\rangle\cdot\prod_{j=i+1}^{N}\langle G_j(\lambda)\rangle\cdot\langle a_j(\lambda)\rangle$$

where $$G_{link}(\lambda) = \frac{P\_Rx(\lambda)}{P\_Tx(\lambda)}$$

The variables $G_i(\lambda)$, $a_i(\lambda)$ and their mean values $\langle G_i(\lambda)\rangle$, $\langle a_i(\lambda)\rangle$ denote the gain of the $i^{th}$ amplification section, the ratio of output power level spectrum to input power level spectrum of an amplification section or the attenuation value of an amplification section. These variables can however also be the gain from an amplifier and the attenuation value of a fiber connected downstream of the amplifier instead of values for an entire amplification section. If the gain differences between the individual channels are slight in comparison with the mean gain, it is permissible to approximate the mean values through the quotients $\langle P\_Rx(\lambda)\rangle/\langle P\_Tx(\lambda)\rangle$ from the mean sum output power level and the mean sum input power level.

A spectral effective noise figure $F_{eff}(\lambda)$ can likewise be calculated directly by the system if the properties of all amplifiers (and fibers) have previously been measured or for example have been specified by the supplier. Alternatively, a typical value can naturally also be used. If this is not possible either, a constant value is assumed.

The power level distribution $P\_Tx(\lambda)$ at the input to the transmission path thus results in the following $$P\_Tx(\lambda) = \frac{\langle P\_Tx(\lambda)^{Beginn}\rangle}{\langle Q(\lambda)\cdot F_{eff}(\lambda)\cdot\rangle}\cdot Q(\lambda)\cdot F_{eff}(\lambda),$$

whereby the fraction ensures that a mean input power level $\langle P\_Tx(\lambda)^{Beginn}\rangle$, which was present at the start of the method, does not change and thus that the input power levels remain approximately equal to dependent amplifier properties.

The power tilt at the input to the amplifiers is now set such that it corresponds to the tilt of the product $Q(\lambda)\cdot F_{eff}(\lambda)$. For approximation purposes the tilt of the function $Q(\lambda)$ (in dB/THz) and the tilt of the effective noise figure $F_{eff}(\lambda)$ (likewise in dB/THz) can also be added to the resulting power tilt.

After the preceding step the method is repeated iteratively, beginning with the second step, until the power level changes of the signals at the input to the transmission path lie beneath a predefined limit from one iteration cycle to the next.

The variables occurring in the above equations are to be used in the linear scale in practical application.

An important advantage of the modification described is the fact that no settings are required from a planning system for the preemphasis with power tilt and the method reacts adaptively to changes in the transmission system (for example, upon a rise in attenuation values caused by an ageing process).

Figure 2:
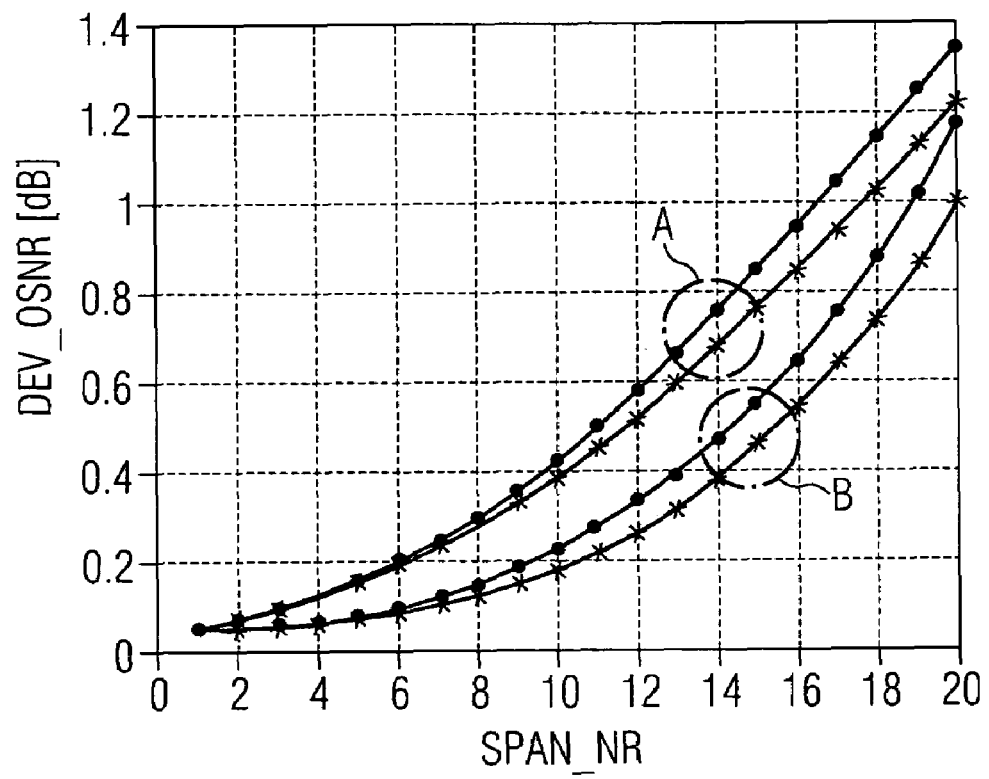
FIG. 2 shows a difference in the signal-to-noise ratios between the present method and a method requiring a planning tool.

In order to verify the present method, simulations have been performed using different configurations—with a conventional planning system for example for determining an exponent k and with the method steps described here—whose results are illustrated in FIG. 2.

The resulting differences DEV_OSNR (see curve pairs A, B) between signal-to-noise ratios OSNR after OSNR preemphasis using preemphasis by means of an exponential specification (with a planning tool) and after OSNR preemphasis using the method according to the invention were plotted for a given number SPAN_NR=1, 2, . . . , 20 of amplification sections. In this situation it was initially assumed that all amplification sections have an attenuation of 21 dB. The simulations were then repeated for all possible cases in which each amplification section has an attenuation of 27 dB. The maximum difference between the result of the OSNR preemphasis considered as the reference and each variant of the present preemphasis is shown in the above representation (see upper curve of each curve pair A, B) as a function of the number of transmission sections and marked by a point. The simulations were repeated using the same procedure, whereby the transmission section differing in its attenuation now has a lower attenuation, namely 15 dB. The results achieved this time were marked by asterisks (see lower curve of each curve pair A, B).

FIG. 2 shows that the invention, in addition to the advantage of being independent from a planning tool, also delivers a signal-to-noise ratio OSNR which is better by up to 0.2 dB (see the difference between curves of the curve pair A, B at SPAN_NR=20). In addition to simplicity and speed, the method thus enables a more precise preemphasis of the signals, as a result of which the transmitted signals exhibit an improved range.

Further interesting aspects of the preemphasis according to the invention are now described in the following.

In the previous equation for calculating the function $Q(\lambda)$ it was assumed that all the amplification sections are identical in respect of the gain. In other words, given N identical amplification sections a gain value $G_i(\lambda)$ i=1, 2, . . . , N is ascertained as follows:

$$G_1(\lambda)=g(\lambda)\cdot\langle G_i(\lambda)\rangle, \forall i=1,2,\ldots,N$$

where $g(\lambda)$ denotes a spectral gain factor common to the identical amplification sections for simplifying the determination of the function $Q(\lambda)$.

Likewise, given N identical amplification sections an attenuation value $a_i(\lambda)$ is ascertained as follows:

$$a_i(\lambda)=a(\lambda)\cdot\langle a_i(\lambda)\rangle, \forall i=1,2,\ldots,N$$

where $a(\lambda)$ denotes a spectral attenuation factor common to the identical amplification sections for simplifying the determination of the function $Q(\lambda)$.

This applies however only as an approximation. In the following, possible improvements are described which presuppose knowledge of the individual amplifiers, whether it be only as a result of the type used or through measurements for example at amplifier outputs.

First it is assumed that a typical extent of the difference in the gain spectra from the mean value of one gain spectrum is known.

In a transmission system different amplifier types can be used in the amplification sections, which exhibit differences of varying magnitude in the gain profile from the mean value of a defined reference gain spectrum. In accordance with its amplifier type, each optical amplifier is now assigned a relative code number $k_i$ which sets the extent of its typical gain variations in relation to those of a reference amplifier. The characteristic function $Q(\lambda)$ for calculating the power level distribution at the input thus results as $$Q(\lambda) = \sum_{i=0}^{N} G_{link}(\lambda)^{-\frac{\left(\sum_{j=0}^{i-1} k_j\right)}{\left(\sum_{j=0}^{N} k_j\right)}} \cdot \langle G_i(\lambda)\rangle \cdot \prod_{j=i+1}^{N} \langle G_j(\lambda)\rangle \cdot \langle a_j(\lambda)\rangle$$

whereby in the case of N different amplification sections a gain value $G_i(\lambda)$ of one of the amplification sections relative to a mean value $\langle G_j(\lambda)\rangle$ j=1, 2, . . . , N (or j=0 in the case of a completely theoretical mean value) for a selected gain is calculated by means of the relative code number ($k_i$).

Furthermore it is assumed that a typical difference between the gain spectra and the mean value for a gain spectrum is known as a function of the wavelength.

In contrast to the case described above, the typical differences $g_j^{typ}(\lambda)$ from the gain factors $g(\lambda)$ are now known as a function of the wavelength $\lambda$. These differences are now raised to a higher power using an exponent in order to calculate an overall gain $G_{ges}(\lambda)$ for the transmission system. In this situation, in the case of N different amplification sections with known gain factors $G_i(\lambda)=g_i^{typ}(\lambda)\cdot\langle G_0(\lambda)\rangle$, $\forall i=1, 2, \ldots, N$ the overall gain $G_{ges}(\lambda)$ between transmitter and receiver is calculated as follows:

$$G_{ges}(\lambda) = \langle G_0(\lambda)\rangle \cdot \left[\prod_{j=1}^{N} \langle G_j(\lambda)\rangle \cdot \langle a_j(\lambda)\rangle\right] \cdot \prod_{i=0}^{N} (g_i^{typ})^{m_i}$$

where $m_i$ is chosen as an exponent of gain factors $g_j^{typ}(\lambda)$ such that characteristic differences between this overall gain $G_{ges}(\lambda)$ and the measured gain $G_{link}(\lambda)$ (=relationship between transmit-side and receive-side measured power levels for the signals) are minimized.

The associated function $Q(\lambda)$ can then be calculated as follows:

$$Q(\lambda) = \frac{\sum_{i=0}^{N}\left(\langle G_i(\lambda)\rangle \cdot \left[\prod_{j=i+1}^{N} \langle G_j(\lambda)\rangle \cdot \langle a_j(\lambda)\rangle\right] \cdot \prod_{j=i}^{N}(g_j^{typ})^{m_j}\right)}{\prod_{i=0}^{N}(g_i^{typ})^{m_i}}.$$

In the following it is assumed that a spectral power level distribution at points within the transmission system is known through a measurement. This is often the case when monitoring facilities for signal power levels are present in the case of one or more amplification sections.

A prerequisite for the implementation of an optimized method is the fact that all the attenuations $a_i(\lambda)$ and gains $G_i(\lambda)$ for the amplification sections are known to a preemphasis system control unit as a function of the wavelength $\lambda$. Since both variables (gain and attenuation) can change as a result of ageing or the exchange of components, a continuous transfer of the current variables to the system control unit, using corresponding measuring facilities and data transmission, by way of a monitoring channel for example, is appropriate. For reasons of cost, however, the two variables $a_{k:m}(\lambda)$, $G_{k:m}(\lambda)$ are ascertained spectrally and not only as a mean value at selected points, for example upstream of the amplification section k and downstream of the amplification section m, such that only ever one partial transmission function $g(\lambda)_{k:m}$ of a group of m−k+1 amplification sections (amplifier with transmission fiber) and all the mean values $\langle G_j(\lambda) \rangle$, $\langle a_j(\lambda) \rangle$ are known.

For the group of 1<m−k+1<N of the N amplification sections the partial transmission function would need to be calculated in accordance with the following specification:

$$g(\lambda)_{k:m} = \prod_{j=k}^{m} G_j(\lambda) \cdot a_j(\lambda)$$

Since the individual variables $a_i(\lambda)$, $G_i(\lambda)$ are however not known for the individual sections of the partial path, the assumption is made when calculating the Q function that the gain or form factors $g_j(\lambda)$ of the gain profile are the same for all amplification sections $j \in [k:m]$ of the partial path and are calculated in accordance with $$g(\lambda)_j = g(\lambda)_{k:m}^{1/(m-k+1)}$$

The corresponding gain functions $G_j(\lambda)$ of the individual amplification sections are therefore modified with $G_j(\lambda) = g(\lambda)_j \cdot \langle G_j(\lambda) \rangle \forall j \in [k:m]$. In order to calculate the function $Q(\lambda)$ the individual amplifications are now no longer approximated with $G_{link}^{-i/(N+1)}(\lambda)$ but more precise estimates for the individual amplifications of the partial path are used. For a group comprising 1<m−k+1<N completely known amplification sections and-identical amplification sections the function $Q(\lambda)$ is now defined as follows:

$$Q(\lambda) = \sum_{i=0}^{N} \prod_{l=0}^{i} G_l^{-1}(\lambda) \cdot \langle G_i(\lambda) \rangle \cdot \prod_{j=i+1}^{N} \langle G_j(\lambda) \rangle \cdot \langle a_j(\lambda) \rangle.$$

The individual amplifications of the partial path are used in the term $G_l^{-1}(\lambda)$ in this situation.

The new method can implemented by means of a control module, whereby a data volume [lacuna] with a program which can be loaded into the control module and the control module executes the method according to the invention in accordance with all the technical aspects and effects of the invention when the aforementioned program is executed.

As an example, the control module can comprise a plurality of local control units in the case of each amplification section which are used for controlling or detecting control signals in conjunction at least with a regulation of the new power level values for the transmitter.

The control module can likewise be part of a (central) network management facility in which the entire transmission system is monitored.

The invention claimed is:

1. A method for preemphasizing an optical multiplex signal that comprises a plurality of signals having different wavelengths, transmitted by a transmitter by way of a plurality of substantially identical amplification sections to a receiver, comprising:

determining on the transmitter a mean power level ($\langle P\_Tx(\lambda)^{Beginn} \rangle$) and an optical power level spectrum ($P\_Tx(\lambda)^{Beginn}$) for the optical multiplex signal;

determining on the receiver an optical power level spectrum ($P\_Rx(\lambda)^{Beginn}$) for the optical multiplex signal;

determining the sum power levels for the multiplex signal at the input to and output from each amplification section, and determining mean gain values ($\langle G_i(\lambda) \rangle$) and mean attenuations ($\langle a_i(\lambda) \rangle$) for each amplification section from the measured values for the sum power levels of the multiplex signal;

calculating a gain function ($G_{link}(\lambda)$) which characterizes an overall gain of a transmission path from a relationship between optical power level spectra ($P\_Tx(\lambda)^{Beginn}$, $P\_Rx(\lambda)^{Beginn}$) determined on the transmitter and the receiver;

using the values $\langle G_i(\lambda) \rangle$ and $\langle a_i(\lambda) \rangle$, calculating a wavelength-dependent function ($Q(\lambda)$) according to the specification $$Q(\lambda) = \sum_{i=0}^{N} G_{link}^{-i/(N+1)}(\lambda) \cdot \langle G_i(\lambda) \rangle \cdot \prod_{j=i+1}^{N} \langle G_j(\lambda) \rangle \cdot \langle a_j(\lambda) \rangle$$

which serves to correct a new signal power level values ($P\_Tx(\lambda)$) to be set on the transmitter, where j represents an auxiliary variable; and using the correction function $Q(\lambda)$ and an effective noise figure ($F_{eff}(\lambda)$), calculating the new signal power level values ($P\_Tx(\lambda)$) to be set on the transmitter according to a formula $$P\_Tx(\lambda) = \frac{Q(\lambda) \cdot F_{eff}(\lambda)}{\langle Q(\lambda) \cdot F_{eff}(\lambda) \rangle} \cdot \langle P\_Tx(\lambda)^{Beginn} \rangle$$

so that signal-to-noise ratios for signals of the multiplex signal can be matched to one another at the receiver, wherein angle brackets represent a mean value for a value entered within them.

2. A method for preemphasizing an optical multiplex signal comprising a plurality of signals having different wavelengths, transmitted by a transmitter by way of a plurality of different amplification sections to a receiver, comprising:

ascertaining on transmitter a mean power level ($\langle P\_Tx(\lambda)^{Beginn} \rangle$) and an optical power level spectrum ($P\_Tx(\lambda)^{Beginn}$) for the optical multiplex signal;

ascertaining on the receiver an optical power level spectrum ($P\_Rx(\lambda)^{Beginn}$) for the optical multiplex signal;

ascertaining the sum power levels for the multiplex signal at the input to and output from each amplification section, and ascertaining mean gain values ($\langle G_i(\lambda) \rangle$) and mean attenuations ($\langle a_i(\lambda) \rangle$) for each amplification section from measured values for the sum power levels of the multiplex signal;

calculating a gain function ($G_{link}(\lambda)$) which characterizes an overall gain of a transmission path from a relationship between optical power level spectra ($P\_Tx(\lambda)^{Beginn}$, $P\_Rx(\lambda)^{Beginn}$) ascertained on the transmitter and the receiver;

ascertaining a relative code number ($k_i$) which characterizes a difference between the gain value ($G_i(\lambda)$) and the mean value ($\langle G_i(\lambda) \rangle$) for each amplification section i for each optical amplifier;

calculating, using the relative code numbers ($k_i$), a wavelength-dependent function ($Q(\lambda)$) according to a specification $$Q(\lambda) = \sum_{i=0}^{N} G_{link}(\lambda)^{-(\sum_{j=1}^{i-1} k_j)/(\sum_{j=0}^{N} k_j)} \cdot \langle G_i(\lambda) \rangle \cdot \prod_{j=i+1}^{N} \langle G_j(\lambda) \rangle \cdot \langle a_j(\lambda) \rangle$$

which serves to correct a new signal power level values (P_Tx($\lambda$)) to be set on the transmitter, and wherein j represents an auxiliary variable; and calculating, using the correction function Q($\lambda$) and an effective noise figure ($F_{eff}(\lambda)$), the new signal power level values (P_Tx($\lambda$)) to be set on the transmitter according to a formula $$\text{P\_Tx}(\lambda) = \frac{Q(\lambda) \cdot F_{eff}(\lambda)}{\langle Q(\lambda) \cdot F_{eff}(\lambda) \rangle} \cdot \langle \text{P\_Tx}(\lambda)^{Beginn} \rangle$$

so that signal-to-noise ratios for signals of the multiplex signal can be matched to one another at the receiver, wherein angle brackets represent a mean value for a value entered within them.

3. A method for preemphasizing an optical multiplex signal that comprises a plurality of signals having different wavelengths, are transmitted by a transmitter by way of a plurality of different amplification sections having amplifiers with known gain factors $G_i(\lambda) = g_i^{typ}(\lambda) \cdot \langle G_o(\lambda) \rangle$, $\forall i=1,2,\ldots,N$ to a receiver, comprising:

ascertaining on the transmitter a mean power level ($\langle \text{P\_Tx}(\lambda)^{Beginn} \rangle$) and an optical power level spectrum (P_Tx($\lambda$)$^{Beginn}$) for the optical multiplex signal;

ascertaining on the receiver an optical power level spectrum (P_Rx($\lambda$)$^{Beginn}$) for the optical multiplex signal;

ascertaining sum power levels for the multiplex signal at the input to and output from each amplification section, and ascertaining mean gain values ($\langle G_i(\lambda) \rangle$) and mean attenuations ($\langle a_i(\lambda) \rangle$) for each amplification section from measured values for the sum power levels of the multiplex signal;

calculating an overall gain ($G_{ges}(\lambda)$) between the transmitter and the receiver according an equation $$G_{ges}(\lambda) = \langle G_0(\lambda) \rangle \cdot \left[ \prod_{j=1}^{N} \langle G_j(\lambda) \rangle \cdot \langle a_j(\lambda) \rangle \right] \cdot \prod_{i=0}^{N} (g_i^{typ})^{m_i}$$

wherein ($M_i$) is chosen as an exponent of gain factors ($g_j^{typ}(\lambda)$) such that characteristic differences between an overall gain ($G_{ges}(\lambda)$) and the measured gain ($G_{link}(\lambda)$) are minimized and wherein $\langle G_o(\lambda) \rangle$ is the mean gain of a first amplifier on the transmitter;

calculating a wavelength-dependent function (Q($\lambda$)) according to a specification $$Q(\lambda) = \frac{\sum_{i=0}^{N} \langle G_i(\lambda) \rangle \cdot \left[ \prod_{j=i+1}^{N} \langle G_j(\lambda) \rangle \cdot \langle a_j(\lambda) \rangle \right] \cdot \prod_{j=i}^{N} (g_j^{typ})^{m_j}}{\prod_{i=0}^{N} (g_i^{typ})^{m_i}},$$

which serves to correct a new signal power level values (P_Tx($\lambda$)) to be set on the transmitter, and where j represents an auxiliary variable; and calculating, using the correction function Q($\lambda$) and an effective noise figure ($F_{eff}(\lambda)$), the new signal power level values (P_Tx($\lambda$)) to be set on the transmitter according to a formula $$\text{P\_Tx}(\lambda) = \frac{Q(\lambda) \cdot F_{eff}(\lambda)}{\langle Q(\lambda) \cdot F_{eff}(\lambda) \rangle} \cdot \langle \text{P\_Tx}(\lambda)^{Beginn} \rangle$$

so that signal-to-noise ratios for signals of the multiplex signal can be matched to one another at the receiver, wherein angle brackets represent a mean value for a value entered within them.

4. A method for preemphasizing an optical multiplex signal comprising a plurality of signals having different wavelengths, transmitted by a transmitter by way of a plurality of amplification sections to a receiver, and a partial transmission function $g(\lambda)_{k:m}$ is known for a group of 1<m−k+1<N of N amplification sections, comprising:

ascertaining on transmitter a mean power level ($\langle \text{P\_Tx}(\lambda)^{Beginn} \rangle$) and an optical power level spectrum (P_Tx($\lambda$)$^{Beginn}$) for the optical multiplex signal;

ascertaining on the receiver an optical power level spectrum (P_Rx($\lambda$)$^{Beginn}$) for the optical multiplex signal;

ascertaining sum power levels for the multiplex signal at the input to and output from each amplification section and mean gain values ($\langle G_i(\lambda) \rangle$), and ascertaining mean attenuations ($\langle a_i(\lambda) \rangle$) for each amplification section from measured values for the sum power levels of the multiplex signal;

defining a partial transmission function $$g(\lambda)_{k:m} = \prod_{j=k}^{m} G_j(\lambda) \cdot a_j(\lambda)$$

for the group of 1<m−k+1<N of N amplification sections such that gain or form factors $g_j(\lambda)$ of a gain profile are identical for all amplification sections j∈[k:m] of a partial path and are calculated in accordance with $$g(\lambda)_j = g(\lambda)_{k:m}^{1/(m-k+1)}$$

where j, k and m are auxiliary variables;

calculating a wavelength-dependent function (Q($\lambda$)), taking $G_j(\lambda) = g(\lambda)_j \cdot \langle G_j(\lambda) \rangle \forall j \in [k:m]$ into consideration, according to a specification $$Q(\lambda) = \sum_{i=0}^{N} \prod_{l=0}^{i} G_l^{-1}(\lambda) \cdot \langle G_i(\lambda) \rangle \cdot \prod_{j=i+1}^{N} \langle G_j(\lambda) \rangle \cdot \langle a_j(\lambda) \rangle,$$

which serves to correct a new signal power level values (P_Tx($\lambda$)) to be set on the transmitter, and where l represents an auxiliary variable; and calculating, using the correction function Q($\lambda$) and an effective noise figure ($F_{eff}(\lambda)$), the new signal power level values (P_Tx($\lambda$)) to be set on the transmitter according to a formula $$\text{P\_Tx}(\lambda) = \frac{Q(\lambda) \cdot F_{eff}(\lambda)}{\langle Q(\lambda) \cdot F_{eff}(\lambda) \rangle} \cdot \langle \text{P\_Tx}(\lambda)^{Beginn} \rangle$$

so that signal-to-noise ratios for signals of the multiplex signal can be matched to one another at the receiver, wherein angle brackets represent a mean value for a value entered within them.

5. A computer-readable medium storing a program for preemphasizing an optical multiplex signal that comprises a plurality of signals having different wavelengths, transmitted by a transmitter by way of a plurality of substantially identical amplification sections to a receiver, the program executable by a computer, comprising:

determining on the transmitter a mean power level ($\langle P\_Tx(\lambda)^{Beginn}\rangle$) and an optical power level spectrum ($P\_Tx(\lambda)^{Beginn}$) for the optical multiplex signal;

determining on the receiver an optical power level spectrum ($P\_Rx(\lambda)^{Beginn}$) for the optical multiplex signal;

determining the sum power levels for the multiplex signal at the input to and output from each amplification section, and determining mean gain values ($\langle G_i(\lambda)\rangle$) and mean attenuations ($\langle a_i(\lambda)\rangle$) for each amplification section from the measured values for the sum power levels of the multiplex signal;

calculating a gain function ($G_{link}(\lambda)$) which characterizes an overall gain of a transmission path from a relationship between optical power level spectra ($P\_Tx(\lambda)^{Beginn}$, $P\_Rx(\lambda)^{Beginn}$) determined on the transmitter and the receiver;

using the values $\langle G_i(\lambda)\rangle$ and $\langle a_i(\lambda)\rangle$, calculating a wavelength-dependent function ($Q(\lambda)$) according to the specification $$Q(\lambda) = \sum_{i=0}^{N} G_{link}^{-i/(N+1)}(\lambda) \cdot \langle G_i(\lambda)\rangle \cdot \prod_{j=i+1}^{N} \langle G_j(\lambda)\rangle \cdot \langle a_j(\lambda)\rangle$$

which serves to correct a new signal power level values ($P\_Tx(\lambda)$) to be set on the transmitter, where j represents an auxiliary variable; and using the correction function $Q(\lambda)$ and an effective noise figure ($F_{eff}(\lambda)$), calculating the new signal power level values ($P\_Tx(\lambda)$) to be set on the transmitter according to a formula $$P\_Tx(\lambda) = \frac{Q(\lambda) \cdot F_{eff}(\lambda)}{\langle Q(\lambda) \cdot F_{eff}(\lambda)\rangle} \cdot \langle P\_Tx(\lambda)^{Beginn}\rangle$$

so that signal-to-noise ratios for signals of the multiplex signal can be matched to one another at the receiver, wherein angle brackets represent a mean value for a value entered within them.

6. The method according claim 5, wherein the control module comprises at least one local control unit at each amplification section.

7. The method according claim 5, wherein the control module is part of a network management system.

8. A computer-readable medium storing a program for preemphasizing an optical multiplex signal comprising a plurality of signals having different wavelengths, transmitted by a transmitter by way of a plurality of different amplification sections to a receiver, the program executable by a computer, comprising:

ascertaining on the transmitter a mean power level ($\langle P\_Tx(\lambda)^{Beginn}\rangle$) and an optical power level spectrum ($P\_Tx(\lambda)^{Beginn}$) for the optical multiplex signal;

ascertaining on the receiver an optical power level spectrum ($P\_Rx(\lambda)^{Beginn}$) for the optical multiplex signal;

ascertaining the sum power levels for the multiplex signal at the input to and output from each amplification section, and ascertaining mean gain values ($\langle G_i(\lambda)\rangle$) and mean attenuations ($\langle a_i(\lambda)\rangle$) for each amplification section from measured values for the sum power levels of the multiplex signal;

calculating a gain function ($G_{link}(\lambda)$) which characterizes an overall gain of a transmission path from a relationship between optical power level spectra ($P\_Tx(\lambda)^{Beginn}$, $P\_Rx(\lambda)^{Beginn}$) ascertained on the transmitter and the receiver;

ascertaining a relative code number ($K_i$) which characterizes a difference between the gain value ($G_i(\lambda)$) and the mean value ($\langle G_i(\lambda)\rangle$) for each amplification section i for each optical amplifier;

calculating, using the relative code numbers ($K_i$), a wavelength-dependent function ($Q(\lambda)$) according to a specification $$Q(\lambda) = \sum_{i=0}^{N} G_{link}(\lambda)^{-(\sum_{j=0}^{i-1} k_j)/(\sum_{j=0}^{N} k_j)} \cdot \langle G_i(\lambda)\rangle \cdot \prod_{j=i+1}^{N} \langle G_j(\lambda)\rangle \cdot \langle a_j(\lambda)\rangle$$

which serves to correct a new signal power level values ($P\_Tx(\lambda)$) to be set on transmitter, and wherein j represents an auxiliary variable; and calculating, using the correction function $Q(\lambda)$ and an effective noise figure ($F_{eff}(\lambda)$), the new signal power level values ($P\_Tx(\lambda)$) to be set on the transmitter according to a formula $$P\_Tx(\lambda) = \frac{Q(\lambda) \cdot F_{eff}(\lambda)}{\langle Q(\lambda) \cdot F_{eff}(\lambda)\rangle} \cdot \langle P\_Tx(\lambda)^{Beginn}\rangle$$

so that signal-to-noise ratios for signals of the multiplex signal can be matched to one another at the receiver, wherein angle brackets represent a mean value for a value entered within them.

9. The method according claim 8, wherein the control module comprises at least one local control unit at each amplification section.

10. The method according claim 8, wherein the control module is part of a network management system.

11. A computer-readable medium storing a program for preemphasizing an optical multiplex signal that comprises a plurality of signals having different wavelengths, are transmitted by a transmitter by way of a plurality of different amplification sections having amplifiers with known gain factors $G_i(\lambda) = g_i^{typ}(\lambda) \cdot \langle G_0(\lambda)\rangle$, $\forall i=1, 2, \ldots, N$ to a receiver, the program executable by a computer, comprising:

ascertaining on the transmitter a mean power level ($\langle P\_Tx(\lambda)^{Beginn}\rangle$) and an optical power level spectrum ($P\_Tx(\lambda)^{Beginn}$) for the optical multiplex signal;

ascertaining on the receiver an optical power level spectrum ($P\_Rx(\lambda)^{Beginn}$) for the optical multiplex signal;

ascertaining sum power levels for the multiplex signal at the input to and output from each amplification section, and ascertaining mean gain values ($\langle G_i(\lambda)\rangle$) and mean attenuations ($\langle a_i(\lambda)\rangle$) for each amplification section from measured values for the sum power levels of the multiplex signal;

calculating an overall gain ($G_{ges}(\lambda)$) between the transmitter and the receiver according an equation $$G_{ges}(\lambda) = \langle G_0(\lambda)\rangle \cdot \left[\prod_{j=1}^{N} \langle G_j(\lambda)\rangle \cdot \langle a_j(\lambda)\rangle\right] \cdot \prod_{i=0}^{N} (g_i^{typ})^{m_i}$$

wherein ($m_i$) is chosen as an exponent of gain factors ($g_j^{typ}(\lambda)$) such that characteristic differences between an overall gain ($G_{ges}(\lambda)$) and the measured gain ($G_{link}(\lambda)$) are minimized and wherein $\langle G_o(\lambda)\rangle$ is the mean gain of a first amplifier on the transmitter;

calculating a wavelength-dependent function ($Q(\lambda)$) according to a specification $$Q(\lambda) = \frac{\sum_{i=0}^{N}\langle G_i(\lambda)\rangle \cdot \left[\prod_{j=i+1}^{N}\langle G_j(\lambda)\rangle \cdot \langle a_j(\lambda)\rangle\right] \cdot \prod_{j=i}^{N}(g_j^{typ})^{m_j}}{\prod_{i=0}^{N}(g_i^{typ})^{m_i}},$$

which serves to correct a new signal power level values ($P\_Tx(\lambda)$) to be set on the transmitter, and where j represents an auxiliary variable; and calculating, using the correction function $Q(\lambda)$ and an effective noise figure ($F_{eff}(\lambda)$), the new signal power level values ($P\_Tx(\lambda)$) to be set on the transmitter according to a formula $$P\_Tx(\lambda) = \frac{Q(\lambda) \cdot F_{eff}(\lambda)}{\langle Q(\lambda) \cdot F_{eff}(\lambda)\rangle} \cdot \langle P\_Tx(\lambda)^{Beginn}\rangle$$

so that signal-to-noise ratios for signals of the multiplex signal can be matched to one another at the receiver, wherein angle brackets represent a mean value for a value entered within them.

12. The method according claim 11, wherein the control module comprises at least one local control unit at each amplification section.

13. The method according claim 11, wherein the control module is part of a network management system.

14. A computer-readable medium storing a program for preemphasizing an optical multiplex signal comprising a plurality of signals having different wavelengths, transmitted by a transmitter by way of a plurality of amplification sections to a receiver, and a partial transmission function $g(\lambda)_{k:m}$ is known for a group of $1<m-k+1<N$ of N amplification sections, the program executable by a computer, comprising:

ascertaining on the transmitter a mean power level ($\langle P\_Tx(\lambda)^{Beginn}\rangle$) and an optical power level spectrum ($P\_Tx(\lambda)^{Beginn}$) for the optical multiplex signal;

ascertaining on the receiver an optical power level spectrum ($P\_Rx(\lambda)^{Beginn}$) for the optical multiplex signal;

ascertaining sum power levels for the multiplex signal at the input to and output from each amplification section and mean gain values ($\langle G_i(\lambda)\rangle$), and ascertaining mean attenuations ($\langle a_i(\lambda)\rangle$) for each amplification section from measured values for the sum power levels of the multiplex signal;

defining a partial transmission function $$g(\lambda)_{k:m} = \prod_{j=k}^{m} G_j(\lambda) \cdot a_j(\lambda)$$

for the group of $1<m-k+1<N$ of N amplification sections such that gain or form factors $g_j(\lambda)$ of a gain profile are identical for all amplification sections $j\in[k:m]$ of a partial path and are calculated in accordance with $$g(\lambda)_j = g(\lambda)_{k:m}^{1/(m-k=1)}$$

where j, k and m are auxiliary variables;

calculating a wavelength-dependent function ($Q(\lambda)$), taking $G_j(\lambda) = g(\lambda)_j \cdot \langle G_j(\lambda)\rangle \forall j\in[k:m]$ into consideration, according to a specification $$Q(\lambda) = \sum_{i=0}^{N} \prod_{l=0}^{i} G_l^{-1}(\lambda) \cdot \langle G_i(\lambda)\rangle \cdot \prod_{j=i+1}^{N} \langle G_j(\lambda)\rangle \cdot \langle a_j(\lambda)\rangle,$$

which serves to correct a new signal power level values ($P\_Tx(\lambda)$) to be set on the transmitter, and where l represents an auxiliary variable; and calculating, using the correction function $Q(\lambda)$ and an effective noise figure ($F_{eff}(\lambda)$), the new signal power level values ($P\_Tx(\lambda)$) to be set on the transmitter according to a formula $$P\_Tx(\lambda) = \frac{Q(\lambda) \cdot F_{eff}(\lambda)}{\langle Q(\lambda) \cdot F_{eff}(\lambda)\rangle} \cdot \langle P\_Tx(\lambda)^{Beginn}\rangle$$

so that signal-to-noise ratios for signals of the multiplex signal can be matched to one another at the receiver, wherein angle brackets represent a mean value for a value entered within them.

15. The method according claim 14, wherein the control module comprises at least one local control unit at each amplification section.

16. The method according claim 14, wherein the control module is part of a network management system.

\* \* \* \* \*

UNITED STATES PATENT AND TRADEMARK OFFICE
CERTIFICATE OF CORRECTION

PATENT NO.      : 7,596,320 B2
APPLICATION NO. : 11/239412
DATED           : September 29, 2009
INVENTOR(S)     : Gottwald et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Twenty-eighth Day of September, 2010

David J. Kappos
*Director of the United States Patent and Trademark Office*